(12) United States Patent
Wang et al.

(10) Patent No.: US 8,762,450 B2
(45) Date of Patent: Jun. 24, 2014

(54) APPARATUS AND METHOD FOR REDUCING FREQUENT SERVER MESSAGES

(75) Inventors: Jun Wang, La Jolla, CA (US); George Cherian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 291 days.

(21) Appl. No.: 13/189,224

(22) Filed: Jul. 22, 2011

(65) Prior Publication Data

US 2012/0030280 A1 Feb. 2, 2012

Related U.S. Application Data

(60) Provisional application No. 61/368,197, filed on Jul. 27, 2010.

(51) Int. Cl.
*G06F 15/16* (2006.01)

(52) U.S. Cl.
USPC ............................ 709/203; 709/218; 709/232

(58) Field of Classification Search
USPC ......... 709/203, 217, 223, 224, 227, 218, 232; 370/230.1, 252, 311, 328
See application file for complete search history.

(56) References Cited

U.S. PATENT DOCUMENTS

| 7,295,545 B2 | 11/2007 | Ray et al. | |
|---|---|---|---|
| 7,583,665 B1 | 9/2009 | Duncan et al. | |
| 2006/0168241 A1 | 7/2006 | Puthiyandyil et al. | |
| 2008/0043666 A1* | 2/2008 | Tamura et al. | 370/328 |
| 2008/0232288 A1* | 9/2008 | Venkatachalam et al. | 370/311 |
| 2009/0003208 A1* | 1/2009 | Payyappilly et al. | 370/230.1 |
| 2009/0252072 A1 | 10/2009 | Lind et al. | |
| 2009/0271517 A1* | 10/2009 | Naylor et al. | 709/227 |
| 2010/0039956 A1* | 2/2010 | Zheng | 370/252 |
| 2010/0302932 A1 | 12/2010 | Himeno et al. | |

FOREIGN PATENT DOCUMENTS

| JP | 2001268133 A | 9/2001 |
|---|---|---|
| JP | 2008312020 A | 12/2008 |
| JP | 2009088934 A | 4/2009 |

OTHER PUBLICATIONS

International Search Report and Written Opinion—PCT/US2011/045630, International Search Authority—European Patent Office—Oct. 14, 2011.
Lau J et al: "Layer Two Tunneling Protocol—Version 3 (L2TPv3)-; rfc3931.txt", IETF Standard, Internet Engineering Task Force, IETF, CH, Mar. 1, 2005, XP015009703.

* cited by examiner

*Primary Examiner* — Quang N Nguyen
(74) *Attorney, Agent, or Firm* — Abdollah Katbab

(57) ABSTRACT

An apparatus and method for reducing frequent server messages including receiving a server request from a network server intended for a mobile station; determining whether to forward the server request to the mobile station; and transmitting a server response to the network server based at least in part on the server request on behalf of the mobile station.

43 Claims, 12 Drawing Sheets

APPARATUS AND METHOD FOR REDUCING FREQUENT SERVER MESSAGES

CLAIM OF PRIORITY UNDER 35 U.S.C. §119

The present Application for Patent claims priority to Provisional Application No. 61/368,197 entitled "Apparatus and Method for Reducing Frequent Server Messages" filed Jul. 27, 2010, and assigned to the assignee hereof and hereby expressly incorporated by reference herein.

FIELD

This disclosure relates generally to apparatus and methods for reducing network overhead. More particularly, the disclosure relates to reducing frequent server messages in a wireless communication network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of another telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Disclosed is an apparatus and method for reducing frequent server messages. According to one aspect, a method for reducing frequent server messages including receiving a server request from a network server intended for a mobile station; determining whether to forward the server request to the mobile station; and transmitting a server response to the network server based at least in part on the server request on behalf of the mobile station.

According to one aspect, an apparatus for reducing frequent server messages, the apparatus comprising a processor and a memory, the memory containing program code executable by the processor for performing the following: receiving a server request from a network server intended for a mobile station; determining whether to forward the server request to the mobile station; and transmitting a server response to the network server based at least in part on the server request on behalf of the mobile station.

According to one aspect, an apparatus for reducing frequent server messages including means for receiving a server request from a network server intended for a mobile station; means for determining whether to forward the server request to the mobile station; and means for transmitting a server response to the network server based at least in part on the server request on behalf of the mobile station.

According to one aspect, a computer program product, comprising a computer-readable medium including program codes stored thereon, including receiving a server request from a network server intended for a mobile station; determining whether to forward the server request to the mobile station; and transmitting a server response to the network server based at least in part on the server request on behalf of the mobile station.

Advantages of the present disclosure may include reducing message overhead in a wireless communication network.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
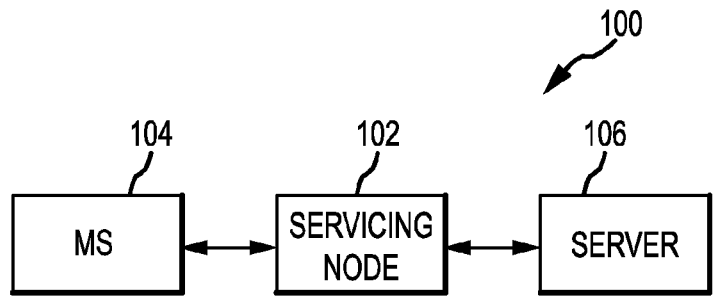
FIG. 1 illustrates an example of a wireless communication system for facilitating wireless network communications through a servicing node.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB or some other terminology.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

The access terminal may host application clients that are to be in communication with an application server. The application server may require the access terminal to inform about the status thereof, such as whether the access terminal is reachable, etc. This may be implemented by exchanging keepalive messages between the access terminal and the application server. For example, a wireless communication system may include a packet data servicing node (PDSN) that provides a wireless terminal with access to a server. In one example configuration, the PDSN may facilitate point-to-point protocol (PPP) communication between the wireless terminal and server. In this example, the server may send multiple PPP-related keepalive or echo requests to the wireless terminal to ensure an active connection. PPP, in one example, is a data link protocol between two network users which may be established over a variety of physical layer media.

In one example, the wireless communication system may allow communications using a layer 2 tunneling protocol (L2TP). In one example, layer 2 is equivalent to a data link layer above a physical layer in a network protocol stack model. In this example, the wireless communication system provides an L2TP access concentrator or L2TP access client (LAC), which may be implemented at the PDSN and facilitates wireless terminal communication with an L2TP network server (LNS). In one aspect, the LAC is a network node on one side of an L2TP tunnel which forwards packets to and from a LNS. In another aspect, the LNS is a network node on another side of an L2TP tunnel which is a logical termination point of a PPP session with the LAC. In one example, the LAC and LNS acts as peers across the L2TP tunnel.

Moreover, for example, the LNS may be implemented at a mobile-to-mobile (M2M) server. In this example, an authentication, authorization, and accounting (AAA) function or another component may be provided as well to authenticate the wireless terminal (and/or PDSN) to communicate with the M2M server. For example, L2TP may be used as a PPP extension. In one example, the M2M server may send L2TP control protocol (LCP) echo requests as keepalive messages to the wireless terminal, which introduces additional signaling in the wireless communication system. The two sides of the L2TP tunnel may be controlled by different organizations. For example, the LNS may be the responsibility of a telecom service provider and the LAC may be the responsibility of a wireless operator. In addition, the telecom provider may not have the ability to control how often such requests are sent from the network server. Thus, usage of L2TP may introduce undesirable signaling overhead to the telecom provider.

As described herein, additional signaling caused by keepalive and other connection management messages sent by a server to a wireless device may be reduced to enhance efficiency of a wireless network, mitigate processing required by a wireless device, improve battery life, and/or the like. In one example, a proxy may be provided for responding to one or more of the keepalive messages or overhead messages for the wireless device without signaling the wireless device for the response. For example, the proxy may be implemented within a servicing node of the wireless network, such as a PDSN in a PPP configuration, a LAC in L2TP, an MME or gateway (e.g., serving gateway, PDN gateway, etc.) in LTE, a SGSN in UMTS, and/or the like. In another example, the server may be modified to decrease a frequency at which it transmits the keepalive or other messages, utilize a disparate message for the keepalive functionality for the wireless device, and/or the like. For example, in an L2TP configuration, a L2TP Hello message may be used in L2TP between a LAC and a LNS, and PPP LCP echo request/reply message may be used between the LAC and the wireless device. In another example, if a link between the servicing node and the wireless device is released, then the servicing node may stop responding to the keepalive message or other connection related messages from the server. In yet another example, the link layer information that is available between the wireless device and the PDSN can be used to signal the application server, instead of using end-to-end keepalive messages between application server and the wireless device.

FIG. 1 illustrates an example of a wireless communication system for facilitating wireless network communications through a servicing node. System 100 includes a servicing node 102 that provides a MS 304 or one or more disparate devices with access to a server 106. It is to be appreciated that additional components may be present in the wireless communication system 100 to facilitate communicating among the depicted nodes (e.g., one or more base stations or relay nodes between the MS 104 and servicing node 102, an authentication, authorization, and accounting (AAA) function or one or more gateway nodes between the servicing node 102 and server 106, etc.). In addition, for example, the MS 104 can be a UE, modem (or other tethered device), a relay node, access point, and/or the like that can communicate with the server 106 via the servicing node 102.

According to an example, the servicing node 102 may implement a proxy to communicate on behalf of the MS 104. For example, the servicing node 102 may be a PDSN and may serve as a PPP proxy, receiving keepalive and/or other PPP-related requests from the server 106 intended for the MS 104 and responding to at least a portion of the requests without signaling to the MS 104. In one example, the servicing node 102 may be a home agent (HA), a local mobility anchor or a packet data network gateway (P-GW). One skilled in the art would understand that the examples listed herein for the servicing node 102 is not meant to be exclusive as other examples are possible within the scope and spirit of the present disclosure. In one example, the servicing node 102 may have its own similar procedures with the MS 104, and may respond to the requests from the server 106 based at least in part on responses received for its procedures. For example, the server 106 may transmit keepalive requests to the servicing node 102 intended for the MS 104. The servicing node 102 may have previously performed a keepalive and/or other PPP-related procedure with the MS 104, and may thus respond to the keepalive request from the server 106 using a previous response from the MS 104 without signaling the MS 104.

In one example, the wireless communication system 100 uses L2TP as a PPP extension. In this example, the server 106 transmits frequent keepalive requests to the MS 104 (via the servicing node 102, which may be a PDSN that acts as a LAC) to ensure the MS 104 is connected to the servicing node 102 and/or is able to communicate with the server 106. For example, the keepalive requests can relate to LCP echo requests transmitted to the MS 104, for which a LCP echo reply is expected to ensure that the connection with the MS 104 is active. The server 106 may transmit such LCP echo requests according to a link layer inactivity timer at the server 106. In one example, the link layer inactivity timer is a PPP inactivity timer.

In one example, the servicing node 102 utilizes an inactivity timer, which can be reset each time communications are received from the MS 104 for keeping status of the MS 104. The inactivity timer at the servicing node 102 may have a larger value than that at the server 106 and/or may be configurable to a higher value (where the server 106 may not have a configurable value). In this regard, where the servicing node 102 receives an LCP echo request from the server 106 for the MS 104, and the inactivity timer for the MS 104 is above a threshold value (e.g., a value less than that indicating inactivity), the servicing node 102 forwards the LCP echo request to the MS 104 to determine whether the MS 104 is active. If the servicing node 102 receives a LCP echo reply from the MS 104, it forwards the LCP echo reply to the server 106. Otherwise, if the inactivity timer for the MS 104 in the servicing node 102 is below a threshold value, the servicing node 102 may reply to the server 106 with the LCP echo reply without forwarding the LCP echo request to the MS 104.

In another example, the server 106 may be modified to decrease frequency at which keepalive requests are sent for the MS 104. For example, in L2TP, the server 106 uses a L2TP keepalive (Hello) message, as opposed to the LCP echo request, as the keepalive message. The L2TP keepalive message may be transmitted to solicit response from the servicing node 102, which can respond with a zero length body acknowledgement (ZLB ACK). When the inactivity timer for the MS 104 is above a threshold value, the servicing node 102 may then convert a received L2TP keepalive to a LCP echo request for the MS 104. Thus, the MS 104 may respond to the echo request with a LCP echo reply, and the servicing node 102 may utilize the reply in responding to the L2TP keepalive. Otherwise, if the inactivity timer for the MS 104 in the servicing node 102 is below a threshold value, the servicing node 102 may reply to the server 106 with L2TP ZLB ACK without sending the LCP echo request message to the MS 104.

In another example, the server 106 may utilize an inactivity timer with a larger value in sending LCP echo requests for the MS 104 so that LCP echo requests are transmitted more infrequently.

Figure 2:
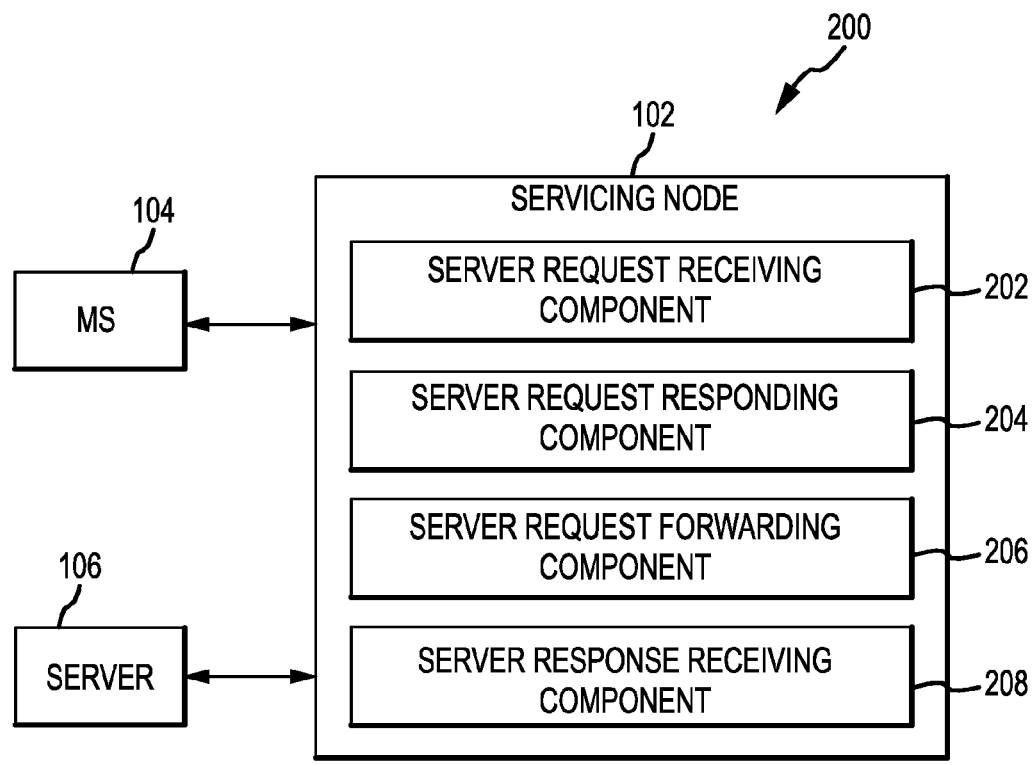
FIG. 2 illustrates an example of a wireless communication system for reducing a number of server requests sent to a mobile station.

FIG. 2 illustrates an example of a wireless communication system 200 for reducing a number of server requests sent to a mobile station. In one example, the wireless communication system 200 facilitates decreasing frequency at which the server requests are transmitted to a wireless device as depicted. In one example, the wireless communication system 200 includes a servicing node 102, which can provide an MS 104 with access to a wireless network via a server 106. In one example, the servicing node 102 includes a server request receiving component 202 that obtains one or more server requests for a MS, a servicing node, or another device. In one example, the servicing node 102 includes a server request responding component 204 that transmits a response to a server. The servicing node 102 may also include a server request forwarding component 206 that communicates a server request to a MS. The servicing node 102 may also include a server response receiving component 208 that obtains a response from a MS.

According to one example, the server 106 transmits a server request related to the MS 104 through the servicing node 102. For example, the server request can be a keepalive request (e.g., transmitted upon expiration of an inactivity timer at the server 106), a status request, and/or the like. The server request receiving component 202 may obtain and examine the server request to determine whether it should respond without signaling the MS 104. For example, where the request is a keepalive request, the server request responding component 204 transmits a keepalive response to the server 106 on behalf of MS 104.

In one example, the server request responding component 204 does so based at least in part on a keepalive procedure previously performed between the servicing node 102 and the MS 104. In one example, the server 106 is an instant messaging (IM) server that transmits keepalive requests to the MS 104 to ensure that the MS 104 is active to receive IMs from the server 106. The servicing node 102 may also perform a similar procedure as part of maintaining the PPP connection. Thus, when the servicing node 102 has a response from a PPP connection keepalive, the server request responding component 204 forwards the PPP connection keepalive or a response based on the PPP connection keepalive to the server 106 without signaling the MS 104. In another example, the server request responding component 204 transmits keepalive or similar messages to the server 106 without receiving a request for such. In yet another example, a PPP keepalive message received from the wireless device is transformed into an IM keepalive message by the serving node and is sent to the server.

In another example, the servicing node 102 implements a LAC to provide L2TP tunnel to the MS 104, and the server 106 implements an LNS (e.g., server 106 may be an M2M server). In this example, the servicing node 102 may receive keepalive requests (e.g., LCP echo requests or similar requests) from the server 106. The servicing node 102 may examine packets transmitted over the L2TP tunnel from the server 106 to the MS 104, and the server request receiving component 202 may obtain the LCP echo request. In one example, the server request responding component 204 may transmit an LCP echo reply to the server 106 without interrupting or otherwise signaling to the MS 104.

In another example, once the server request receiving component 202 obtains the keepalive request from the server 106, server request forwarding component 206 may determine whether to communicate the keepalive request to the MS 104 based at least in part on an inactivity timer (or similar timer) at the servicing node 102 related to the MS 104. Thus, for example, where the inactivity timer is within a threshold value away from an expiration value that indicates inactivity, the server request forwarding component 206 may then transmit the keepalive request to the MS 104. In one aspect, application level keepalive messages may be detected by an information exchange. In one example, the information exchange is between the MS 104 and the servicing node 102. In another example, the information exchange is between the servicing node 102 and the server 106. In one aspect, the information exchange includes packet filter information such as source IP address, target IP address, source port number, target port number, protocol identifier, offset (or location of) application-keep-alive message identifier, application-keep-alive timer. In one example, the servicing node 102 starts operating as the proxy on behalf of the MS 104 after the information exchange has occurred.

In one example, the MS 104 transmits a keepalive response, related to the keepalive request, to the servicing node 102. The server response receiving component 208, in this example, may obtain the keepalive response from the MS 104, and the server request responding component 204 may forward the keepalive response or a related response to the server 106. Thus, for example, the servicing node 102 may respond to at least a portion of the keepalive requests from the server 106 related to the MS 104 without interrupting the MS 104. It is to be appreciated that once the server response receiving component 208 obtains a keepalive response from the MS 104, it may reset the inactivity timer. In another example, the servicing node 102 resets the inactivity timer upon receiving substantially any communications from the MS 104 over PPP.

In another example using L2TP, the server 106 utilizes L2TP keepalive (Hello) messages with the servicing node 102 instead of LCP echo requests related to the MS 104. The servicing node 102 ensures that the MS 104 is active. In this regard, the server 106 may transmit an L2TP keepalive message to the servicing node 102, the server request receiving component 102 may receive the L2TP keepalive message, and the server request forwarding component 206 may determine whether an inactivity timer related to the MS 104 is within a threshold difference of a value that indicates inactivity. If so, the server request forwarding component 206 transmits an LCP echo request to the MS 104. If the server response receiving component 208 obtains an LCP echo reply from the MS 104, the server request responding component 204 may transmit a ZLB ACK to the server 106 in response to the L2TP keepalive message. If the server request receiving component 422 determines that the inactivity timer is not within the threshold difference, the server request responding component 204 transmits a ZLB ACK to the server 106. As described, it is to be appreciated that the server response receiving component 208 may reset the inactivity timer upon receiving the keepalive response from the MS 104.

In yet another example, the servicing node 102 is a mobility management entity (MME) or a gateway in LTE. In one example, the servicing node 102 may establish a GPRS tunneling protocol (GTP) tunnel between the MS 104 and the server 106. The server 106 may similarly request keepalive messages, status messages, or other connection related information of the MS 104 through the servicing node 102. The server request receiving component 202 may similarly receive such a request, and the server request responding component 204 may transmit a response to the server 106 with or without signaling the MS 104 (e.g., depending on information available to the servicing node 102). If a response from MS 104 is needed, the server request forwarding component 206 transmits the request or a related request to the MS 104, and the server response receiving component 208 may obtain a responding message from the MS 104 which the server request responding component 204 may transmit to the server 106.

When the server 106 requests a keepalive message from the servicing node 102 in LTE, the server request responding component 204 may determine whether communication with the ME 104 is active based at least in part on a Tracking-Area-Update timer (e.g., and/or whether the timer is a threshold difference away from indicating communication is inactive, as described). Moreover, for example, the servicing node 102 may be a serving GPRS support node (SGSN) in UMTS and may provide similar functionality between the MS 104 and the server 106 in UMTS.

Figure 3:
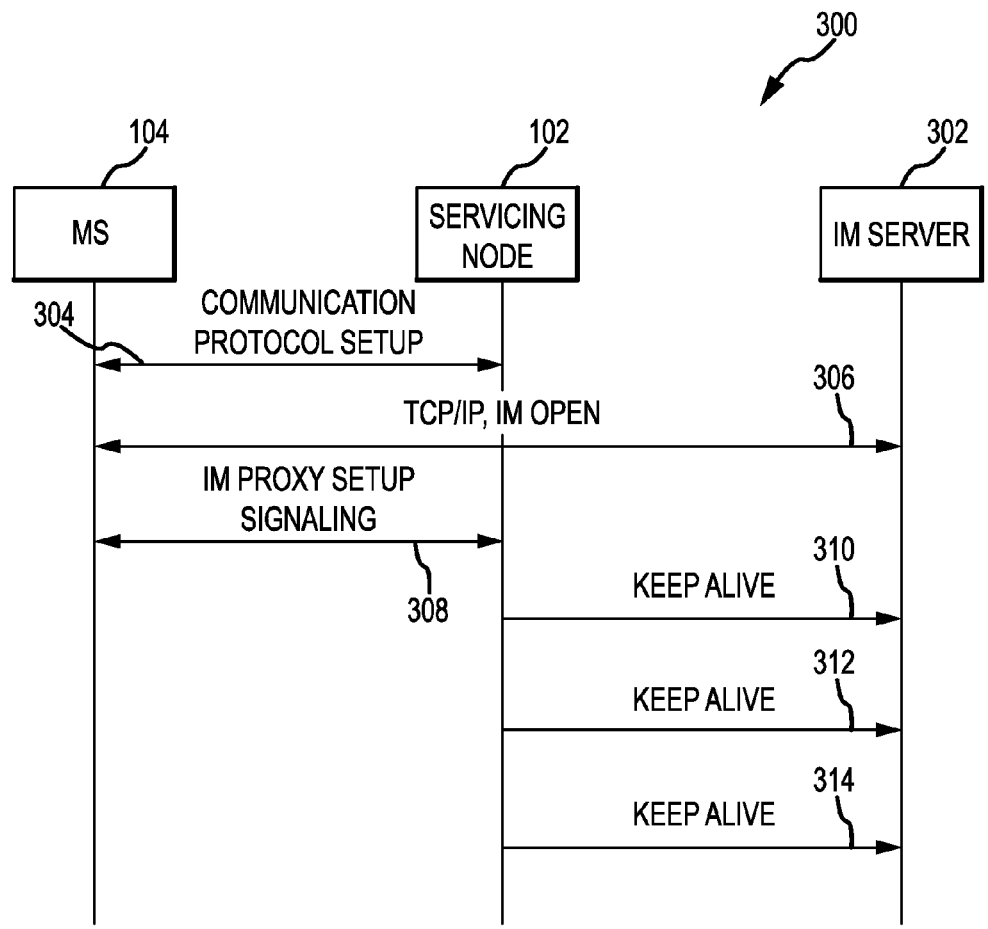
FIG. 3 illustrates an example of a wireless communication system for transmitting server response messages for a mobile station using a proxy.

FIG. 3 illustrates an example of a wireless communication system 300 for transmitting server response messages for a mobile station using a proxy. In one example, the wireless communication system 300 facilitates transmitting server responses using a proxy. As illustrated in FIG. 3, the wireless communication system 300 includes a proxy at a servicing node 102 that provides access to an IM server 302 for at least one MS 104. For example, the MS 104 may be a UE, modem (or other tethered device), a relay node, access point, and/or the like that can communicate with the IM server 302 via the servicing node 102 over a PPP connection, L2TP connection, GTP connection (e.g., in LTE), and/or the like. In addition, it is to be appreciated that additional components may be present in the wireless communication system 300 to facilitate communicating among the depicted nodes.

According to an example, the MS 104 may setup a communication protocol 304 with the servicing node 102. For example, the MS 104 may establish a TCP/IP session establishment or an IM open request 506 (and/or the like) with the IM server 302 (e.g., via the servicing node 102). It is to be appreciated that the MS 104 may have previously setup a connection with the servicing node 102 and optionally a proxy context. Once connected, the MS 104 may also establish a proxy signaling 308 with the servicing node 102 to receive and transmit IM signals from/to the IM server 302 through the servicing node 102. For example, the servicing node 102 may transmit keepalive messages 310, 312, and 314 to the IM server 302 on behalf of the MS 104. For example, the servicing node 102 may forward the keepalive messages 310, 312, and 314 without being solicited from the IM server 302. In addition, the servicing node 102 may store a context of the MS 104 and the keepalive messages 310, 312, or 314, status messages or other messages may be transmitted based at least in part on the context (which may include a timer for sending such messages, for example). In another example, the servicing node 102 facilitates compressing headers for communications between the MS 104 and the IM server 302 based at least in part on the stored context.

Figure 4:
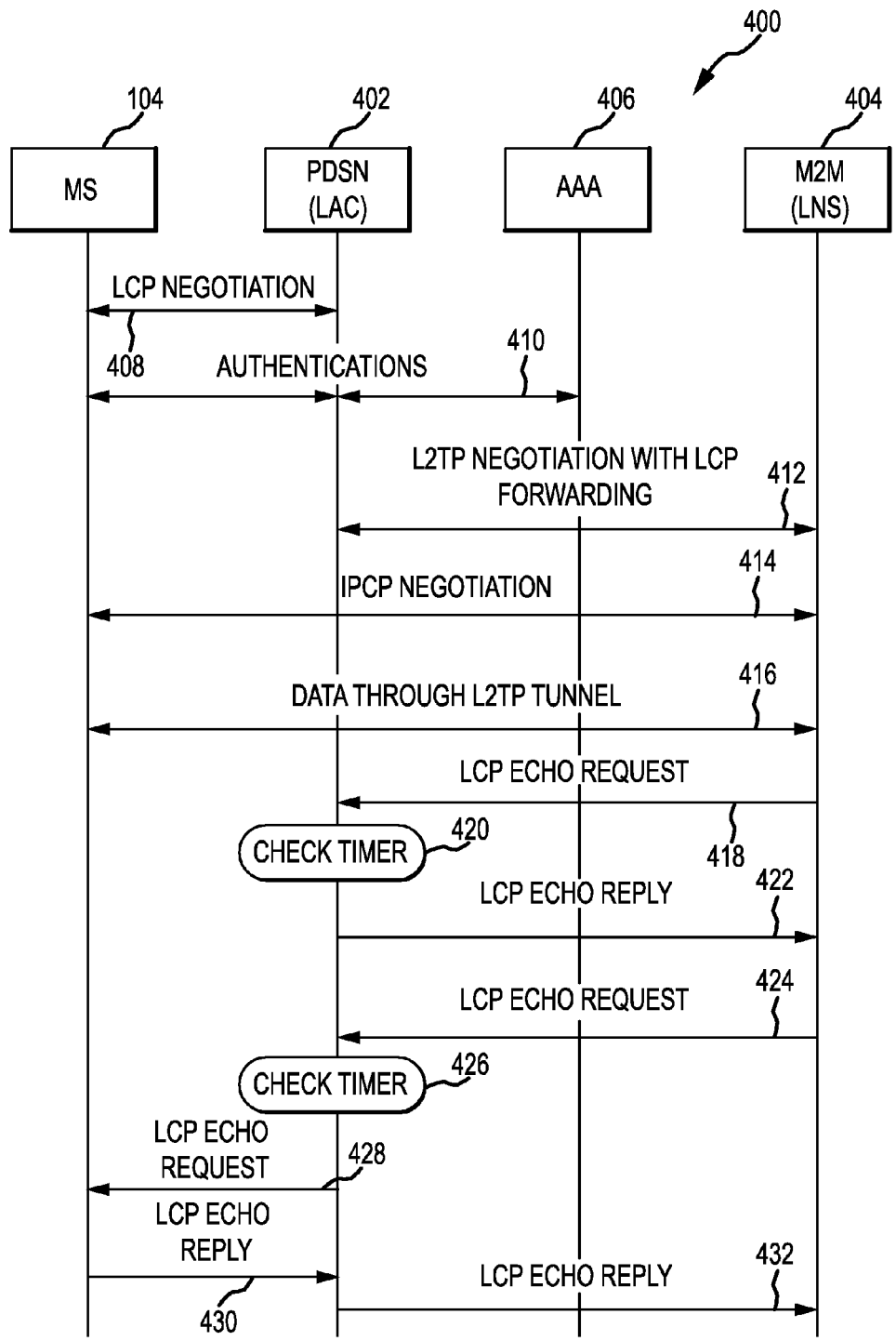
FIG. 4 illustrates an example of a wireless communication system for reducing a number of keepalive messages in layer 2 tunneling protocol (L2TP) communications.

FIG. 4 illustrates an example of a wireless communication system 400 for reducing a number of keepalive messages in L2TP communications. In one example, the wireless communication system 400 facilitates decreasing LCP echo requests transmitted to an MS. As illustrated in FIG. 4, the wireless communication system 400 includes a packet data serving node (PDSN) 402, which may be an LAC, that provides network access to a MS 104 via an M2M server 404, which may be an LNS. In addition, the wireless communication system 400 may include an Authentication, Authorization, and Accounting (AAA) module 406 between the PDSN 402 and the M2M server 404 to authenticate the PDSN 402 and/or the MS 104 for communicating with the M2M server 404.

According to one example, the MS 104 performs a LCP negotiation 408 with the PDSN 402 to establish a PPP session. In this example, the PDSN 402 may request authentication information from the MS 104, and provide received authentication information to the AAA 406 at 410. Additionally, at 410, the AAA 406 may authenticate the MS 104 and may forward acknowledgement and/or further authentication information to the MS 104 through the PDSN 402. The PDSN 402 may subsequently negotiate a L2TP tunnel with a LCP state and authentication state forwarding 412 to the LNS (e.g., M2M server) 404 to provide an L2TP session (or related tunnel) for the MS 104. In addition, for example, the MS 104 may negotiate an Internet Protocol Control Protocol (IPCP) 414 with the M2M server 404 to receive an IP address and/or other address for communicating with, and the MS 104 may transmit data through the L2TP tunnel 416 to the M2M server 404.

In one example, as part of an established L2TP session for the MS 104, the M2M server 404 transmits the LCP echo request 418 related to the MS 104 to ensure that the MS 104 is active. The PDSN 402 may receive the LCP echo request for the MS 104 and may examine the request. For example, the PDSN 402 may check a timer 420 (e.g., a PPP inactivity timer) to determine whether to forward the LCP echo request to the MS 104. In this example, the timer may be outside of a threshold difference between the timer and a value indicating PPP inactivity, and thus, the PDSN 402 may transmit an LCP echo reply 422 to the M2M server 404 without forwarding to the MS 104.

Subsequently (e.g., after one or more additional LCP echo requests or otherwise), the M2M server 404 may transmit another LCP echo request 424 for the MS 104. The PDSN 402 may examine the request and may check the timer again 426. In this example, the timer may be within the threshold difference described above (or expired, as in one example), and thus, the PDSN 402 may forward the LCP echo request 428 to the MS 104. The MS 104 may send an LCP echo reply 430 to the PDSN 402 for providing to the M2M server 404, and the PDSN 402 may provide the LCP echo reply 432 to the M2M server 404. It is to be appreciated that the PDSN 402 may reset the timer upon receiving the LCP echo reply 430. In another example, the LCP echo requests 418 and 424 may be L2TP keepalive (Hello) messages, and the LCP echo replies 422 and 432 may be ZLB ACKs.

Figure 5:
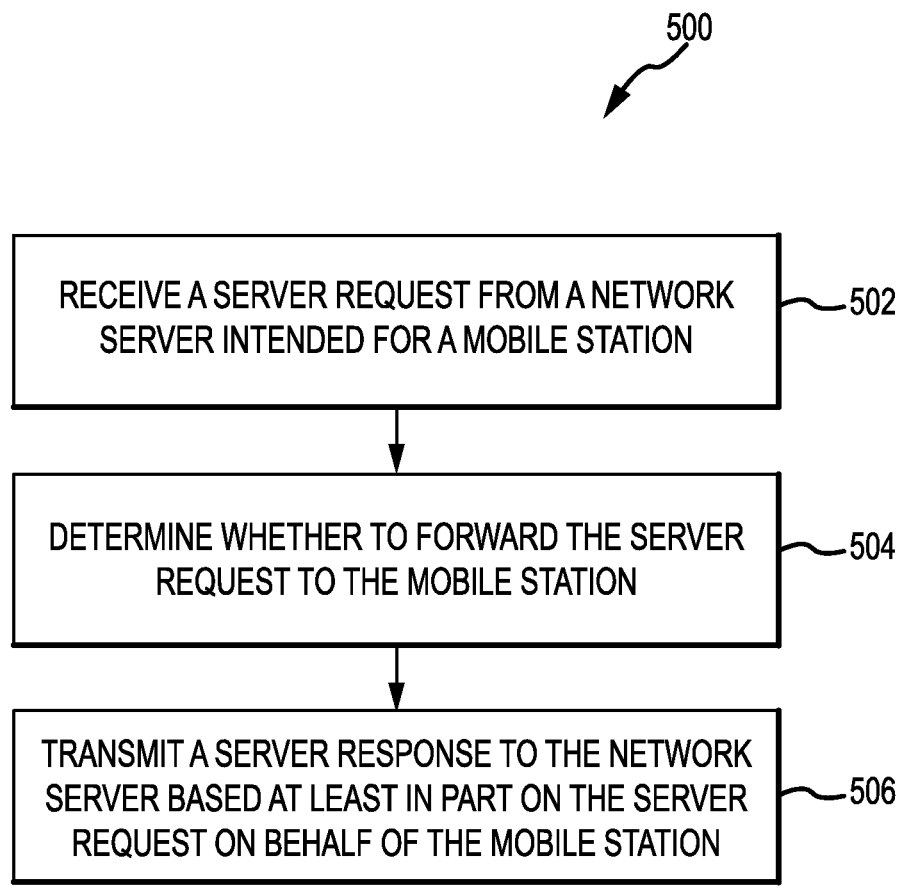
FIG. 5 illustrates an example of a flow diagram for reducing the frequency of forwarding server messages to a mobile station.

FIG. 5 illustrates an example of a flow diagram 500 for reducing the frequency of forwarding server messages to a mobile station. In one example, the flow diagram 500 allows to facilitate decreasing a number of server requests sent to a mobile station. At 502, receive a server request intended for a mobile station from a network server. The request may be a keepalive request (e.g., LCP echo request, an L2TP keepalive (Hello) message, and/or the like), a status request, etc. In addition, in one example, the network server may be an IM server, an LNS, and/or the like. At 504, determine whether to forward the server request to the mobile station. For example, this determination may be made based at least in part on an inactivity timer related to the mobile station, a stored context of the mobile station, and/or the like. In one example, the determining step includes resetting the inactivity timer upon the receiving the keepalive response. In one aspect, the determining step further comprises forwarding the keepalive request to the mobile station based at least in part on the value of the inactivity timer; and receiving the server response from the mobile station, wherein the server response is a keepalive response. In one aspect, the determining step further comprises converting a L2TP keepalive message to a point-to-point protocol (PPP) link control protocol (LCP) echo request; and transmitting the PPP LCP echo request to the mobile station based at least in part on a value of an inactivity timer. In another aspect, the determining step further comprises receiving an LCP echo reply from the mobile station; and transmitting a zero length body acknowledgement to the network server in response to the L2TP keepalive message based at least in part on the receiving the LCP echo reply.

At 506, transmit a server response to the network server based at least in part on the server request. Thus, for example, the server response may be received from the mobile station in response to forwarding the server request thereto or may be transmitted without interrupting the mobile station. The server response may be a keepalive response (e.g., an LCP echo response), a status response, and/or the like.

Figure 6:
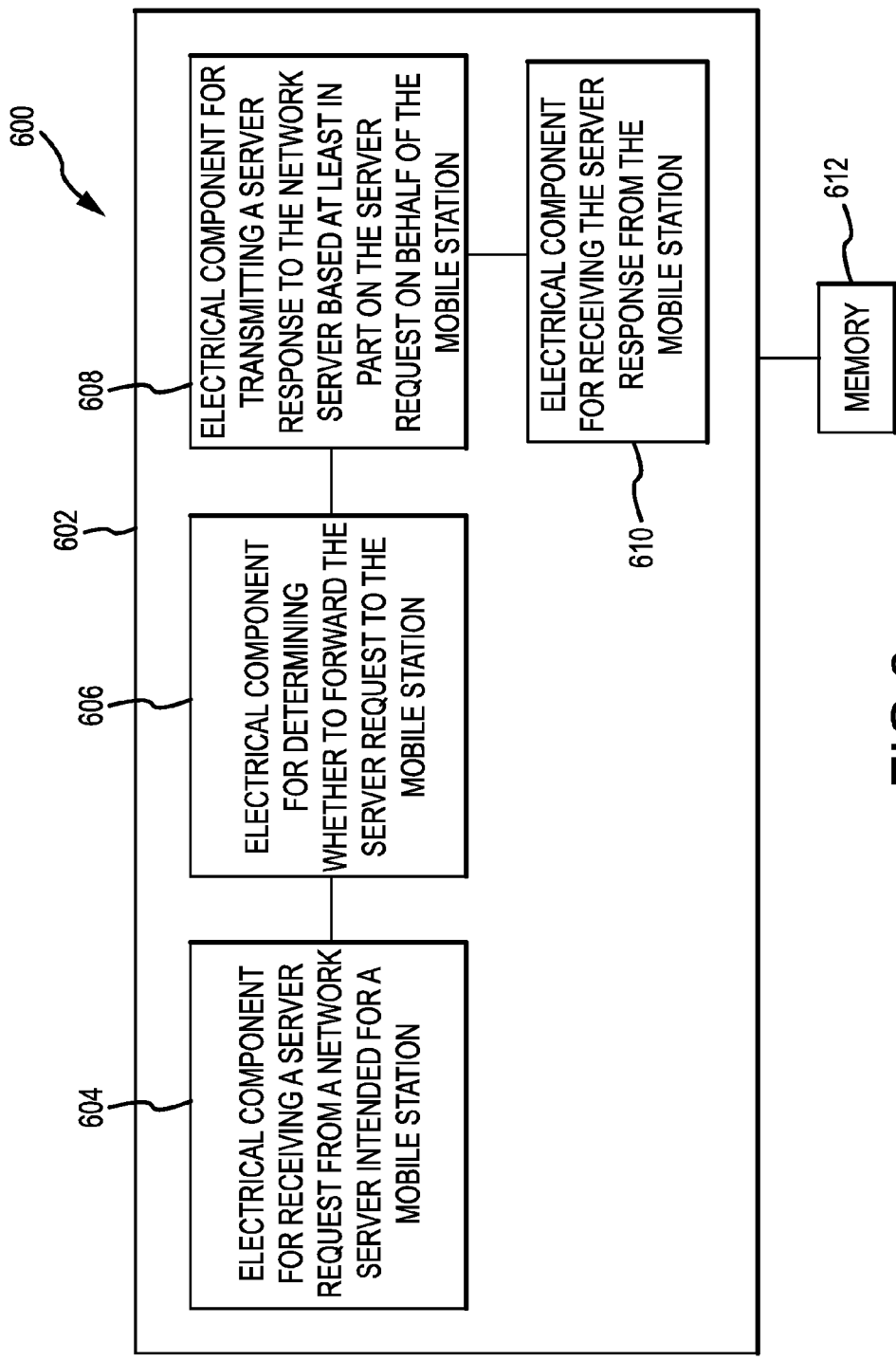
FIG. 6 illustrates an example of a device for reducing the number of server messages forwarded to a mobile station.

FIG. 6 illustrates an example of a device 600 for reducing the number of server messages forwarded to a mobile station. In one example, the device 600 may facilitate transmitting server responses with or without forwarding related server requests to a mobile device. For example, the device 600 may reside at least partially within a base station, mobile device, etc. It is to be appreciated that the device 600 is represented as including functional blocks, which may be functional blocks that represent functions implemented by a processor, software, or combination thereof (e.g., firmware). In one aspect, the device 600 includes a logical grouping 602 of electrical components that can act in conjunction. For instance, the logical grouping 602 may include an electrical component for receiving a server request from a network server intended for a mobile station 604. For example, the server request may relate to a LCP echo request, L2TP keepalive (Hello) message, and/or the like. In addition, the network server may be an IM server, LNS, etc.

Furthermore, the logical grouping 602 may include an electrical component for determining whether to forward the server request to the mobile station 606. And, in one example, this may include determining a value of an inactivity timer related to the mobile station, wherein the server request is a keepalive request. If the inactivity timer value is less than a threshold difference from a value indicating inactivity, for example, the electrical component 606 may forward the keepalive request to the mobile station. The logical grouping 602 may additionally include an electrical component for transmitting a server response to the network server based at least in part on the server request on behalf of the mobile station 608. Thus, whether or not the electrical component 606 forwards the server request, the electrical component 608 may transmit a server response.

Moreover, the logical grouping 610 may include an electrical component for receiving the server response from the mobile station 610. This may occur where the electrical component 606 forwards the server request to the mobile station (e.g., based at least in part on a local inactivity timer, to obtain information for which there is no local parameter that is previously received from the mobile station, etc.). Additionally, the device 600 may include a memory 612 that retains instructions for executing functions associated with the electrical components 604, 606, 608, and 610. While shown as being external to the memory 612, it is to be understood that one or more of the electrical components 604, 606, 608, and 610 may exist within the memory 612.

Figure 7:
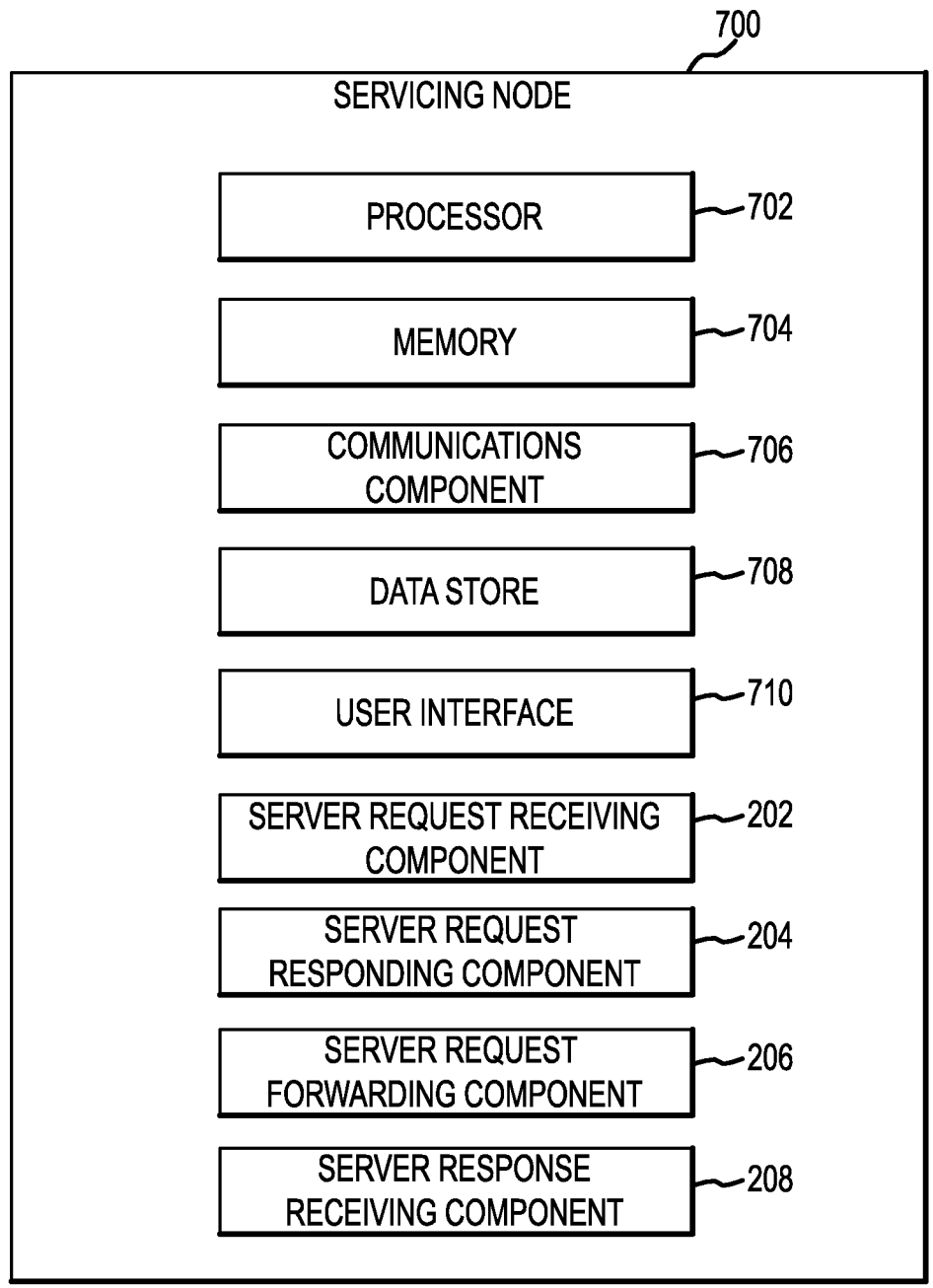
FIG. 7 illustrates an example of a servicing node in accordance with aspects described herein.

FIG. 7 illustrates an example of a servicing node in accordance with aspects described herein. In one example, the servicing node 700 includes a processor 702 for carrying out processing functions associated with one or more of components and functions described herein. The processor 702 may include a single or multiple set of processors or multi-core processors. Moreover, the processor 702 may be implemented as an integrated processing system and/or a distributed processing system.

In one aspect, the servicing node 700 further includes a memory 704, such as for storing local versions of applications being executed by the processor 702. The memory 704 may include a type of memory usable by a computer, such as random access memory (RAM), read only memory (ROM), tapes, magnetic discs, optical discs, volatile memory, non-volatile memory, and any combination thereof.

Furthermore, in one aspect, the servicing node 700 includes a communications component 706 that provides for establishing and maintaining communications with one or more parties utilizing hardware, software, and services as described herein. The communications component 706 may carry communications between components on the servicing node 700, as well as between the servicing node 700 and external devices, such as devices located across a communications network and/or devices serially or locally connected to the servicing node 700. For example, the communications component 706 may include one or more buses, and may further include transmit chain components and receive chain components associated with a transmitter and receiver, respectively, operable for interfacing wirelessly or over a wire with external devices.

Additionally, the servicing node 700 may further include a data store 708, which may be any suitable combination of hardware and/or software, that provides for mass storage of information, databases, and programs employed in connection with aspects described herein. For example, the data store 708 may be a data repository for applications not currently being executed by the processor 702.

The servicing node 700 may additionally include a user interface component 710 operable to receive inputs from a user of the servicing node 700, and further operable to generate outputs for presentation to the user. The user interface component 710 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user interface component 710 may include one or more output devices, including but not limited to a display, a speaker, a haptic feedback mechanism, a printer, any other mechanism capable of presenting an output to a user, or any combination thereof.

The servicing node 700 may include a server request receiving component 202 that may obtain one or more server requests for an MS from a network server, a server request responding component 204 that transmits a server response to the network server (e.g., based on a response from an MS or otherwise locally generated and transmitted so as not to signal the MS), a server request forwarding component 206 that transmits the received server request to an MS, and a server response receiving component 208 that obtains a server response from the MS where the request is transmitted thereto. For example, the communications component 606 may facilitate receiving communications that include the server requests or responses and may additionally facilitate transmitting communications including such. Moreover, the processor 602, for example, may execute one or more of the components 202, 204, 206, and 208.

In one aspect, L2TP may be used as a PPP extension between a cellular operator and a service provider. However, keepalive messages executed by the PPP in an LNS may result in unnecessary signaling to the cellular operator network. In general, the operator has no control over any network entity owned by the service provider. A gateway, e.g. PDSN, in the cellular network may be the proxy to control the keepalive message sent by the LNS which may result in reduced unnecessary signaling in the operator's network over the air interface and backhaul link.

In one example, a network may have an M2M server and a PDSN using L2TP where an LNS is located in the M2M server, an LAC is located in the PDSN and several Request for Comments (RFCs) such as RFC 2661 (L2TP v2), RFC 2867 (RADIUS Accounting Modifications for Tunnel Protocol Support), and RFC 2868 (RADIUS Attributes for Tunnel Support). In another example, the M2M server sends keepalive messages often, where the keepalive messages use PPP LCP Echo Request and Reply. This step may add significant unnecessary traffic to the air interface and network. In some cases, a party may not have control over the M2M server.

Figure 8:
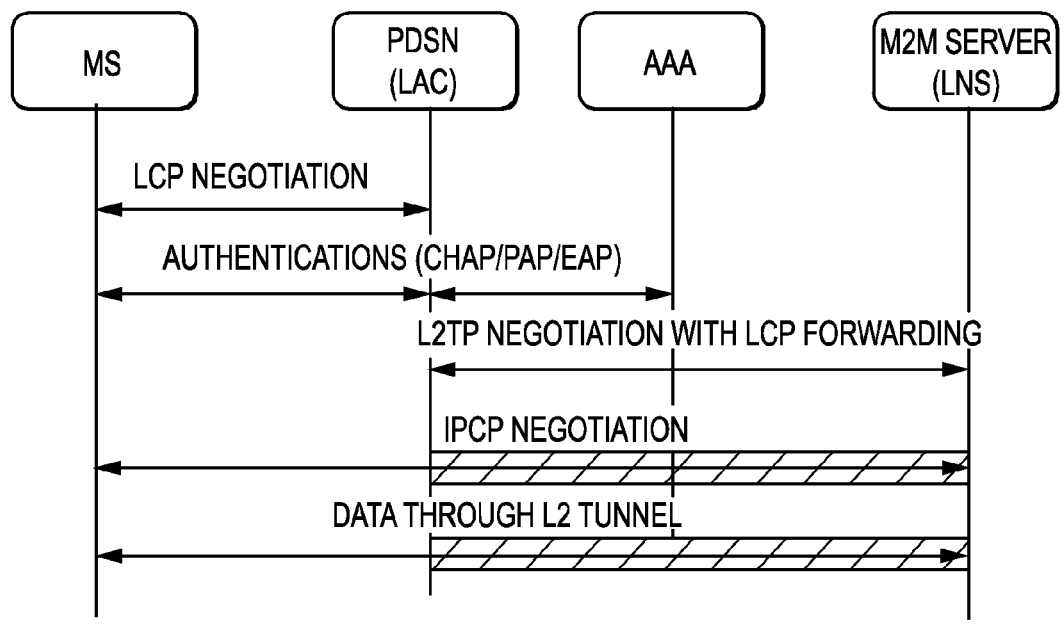
FIG. 8 illustrates an example of a call flow for reducing signaling overhead in an L2TP tunnel.

FIG. 8 illustrates an example of a call flow for reducing signaling overhead in an L2TP tunnel. There are several options for this implementation. In a first option, the PDSN (LAC) may serve as a PPP proxy. In one aspect, the PDSN examines PPP packets over L2TP and if the PPP packet is an LCP Echo Request, the PDSN may forward LCP Echo Request to the MS, reset the PPP inactivity timer after receiving LCP Echo Reply from the MS and then forward the LCP Echo Reply to the LNS, if the PPP Inactivity timer configured in the PDSN is nearing expiration. Otherwise, the PDSN may reply with an LCP Echo Reply on behalf of the MS to the LNS without forwarding the LCP Echo Request to the MS.

In a second option, the LNS may use a L2TP Keepalive (Hello) message where the PDSN converts the L2TP Hello message to an LCP Echo Request if necessary. If the PPP Inactivity timer configured in the PDSN is close to expiration, the PDSN may send an LCP Echo Request to the MS, reset the PPP Inactivity timer after receiving an LCP Echo Reply from the MS, and then send an L2TP ZLB ACK to the LNS>.

In a third option, the PPP Inactivity timer in the LNS may be configured with a large value so that the LNS will send LCP Echo Request messages less frequently.

Figure 9:
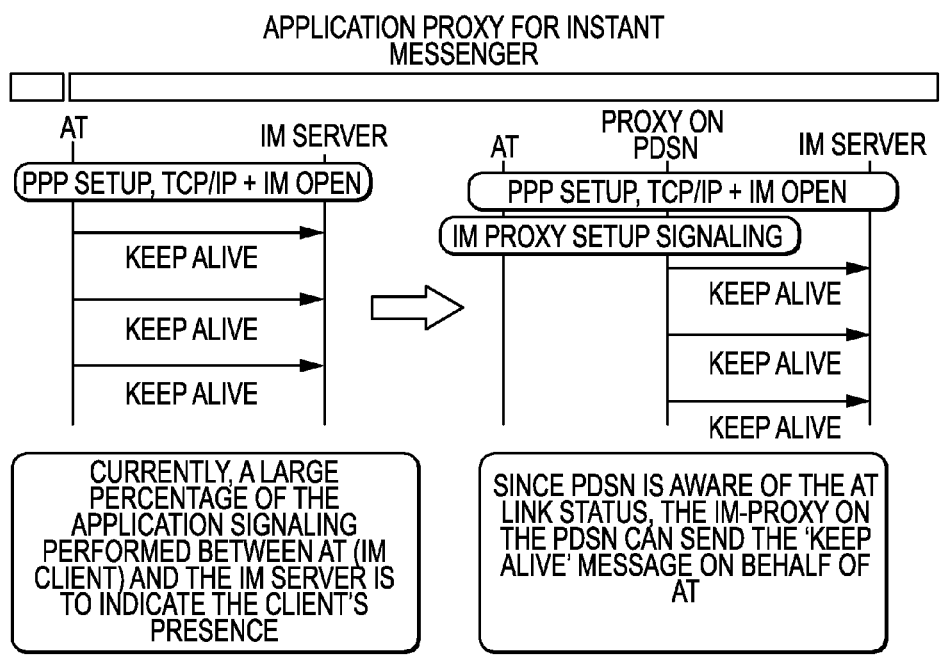
FIG. 9 illustrates an example application for instant messenger.

FIG. 9 illustrates an example application for instant messenger. In one example, FIG. 9 illustrates example implementations for implementing a proxy to handle status requests for a mobile station without necessarily signaling the mobile station. As shown, a prior art implementation with application signaling between an access terminal (AT) and an IM server is replaced with a proxy on the PDSN which may send Keepalive messages on behalf of the AT.

In one aspect, an application proxy may be established at the PDSN. The application proxy may perform signaling, which does not contain user-generated data, with the application server on behalf of the UE. Examples of the signaling may include Keepalive messages, status update messages, etc. In one example, PPP link status that is known at the PDSN may be used to generate application layer keepalive messages.

In another aspect, usage of an application proxy has several advantages, For example, application level signaling that is based on "presence" indications may be handled by the proxy, for example, in the case of Instant Messaging (IM). If a context is maintained at the proxy, application header compression may be employed between the AT and the application proxy. For example, GETzip is an example for http-based compression.

In another aspect, the application proxy may be located in an entity that is aware of the link status of the AT, which helps with the presence information. In an example of HRPD, the PDSN/HSGW may be aware of the link status of the AT. In another example, an application proxy may be provided by an application writer; however, in this case the application proxy may take advantage of link level information coming from PDSN. The PDSN may provide application programming interfaces (APIs) which the application proxy may use, e.g., link status, quality of service (QoS) metrics, etc. In another example, the PDSN may employ deep packet inspection (DPI) to identify and intercept the application packets based on port number.

One skilled in the art would understand that the steps disclosed in the example flow diagram in FIG. 5 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 10:
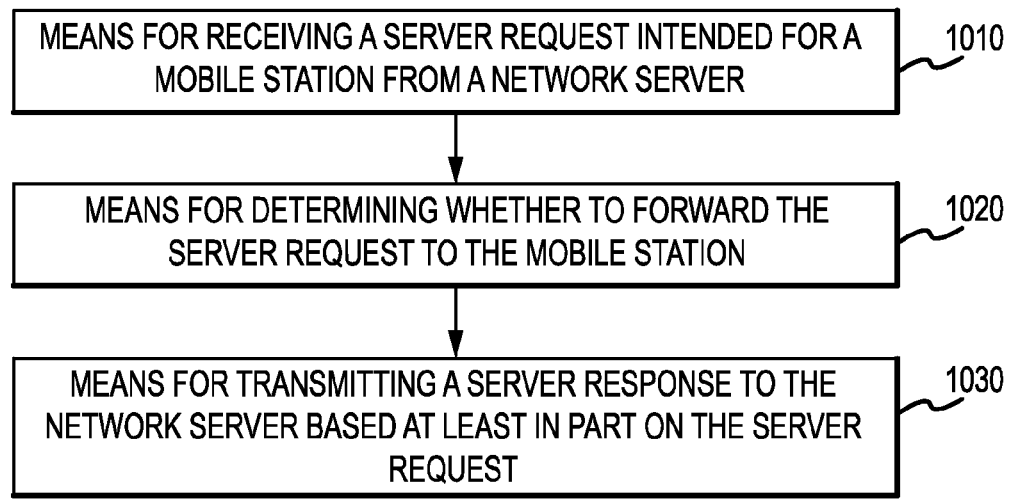
FIG. 10 illustrates an example of another device suitable for reducing the frequency of forwarding server messages to a mobile station.

FIG. 10 illustrates an example of a device 1000 suitable for reducing the frequency of forwarding server messages to a mobile station. In one aspect, the device 1000 is implemented by at least one processor comprising one or more modules configured to provide different aspects of reducing the frequency of forwarding server messages to a mobile station as described herein in blocks 1010, 1020 and 1030. For example, each module includes hardware, firmware, software, or any combination thereof. In one aspect, the device 1000 is also implemented by at least one memory in communication with the at least one processor.

Figure 11:
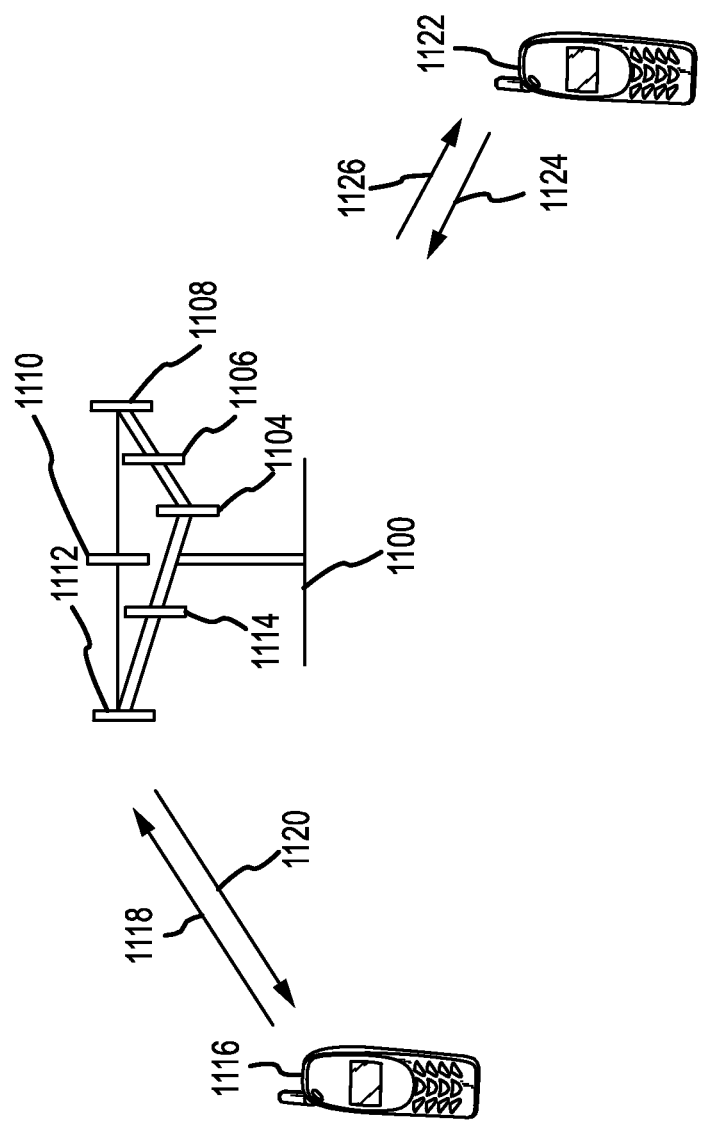
FIG. 11 illustrates an example of a multiple access wireless communication system according to one aspect of the present disclosure.

FIG. 11 illustrates an example of a multiple access wireless communication system according to one aspect of the present disclosure. In FIG. 11, an access point 1100 (AP) includes multiple antenna groups, one including 1104 and 1106, another including 1108 and 1110, and an additional including 1112 and 1114. In FIG. 11, only two antennas are shown for each antenna group, however, more or fewer antennas may be utilized for each antenna group. Access terminal 1116 (AT) is in communication with antennas 1112 and 1114, where antennas 1112 and 1114 transmit information to access terminal 1116 over forward link 1120 and receive information from access terminal 1116 over reverse link 1118. Access terminal 1122 is in communication with antennas 1106 and 1108, where antennas 1106 and 1108 transmit information to access terminal 1122 over forward link 1126 and receive information from access terminal 1122 over reverse link 1124. In a FDD system, communication links 1118, 1120, 1124 and 1126 may use different frequency for communication. For example, forward link 1120 may use a different frequency then that used by reverse link 1118.

Each group of antennas and/or the area in which they are designed to communicate is often referred to as a sector of the access point. In one example, antenna groups each are designed to communicate to access terminals in a sector, of the areas covered by access point 1100.

In communication over forward links 1120 and 1126, the transmitting antennas of access point 1100 utilize beamforming in order to improve the signal-to-noise ratio of forward links for the different access terminals 1116 and 1124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an eNodeB or some other terminology. An access terminal may also be called an access terminal, user equipment (UE), a wireless communication device, terminal, access terminal or some other terminology.

Figure 12:
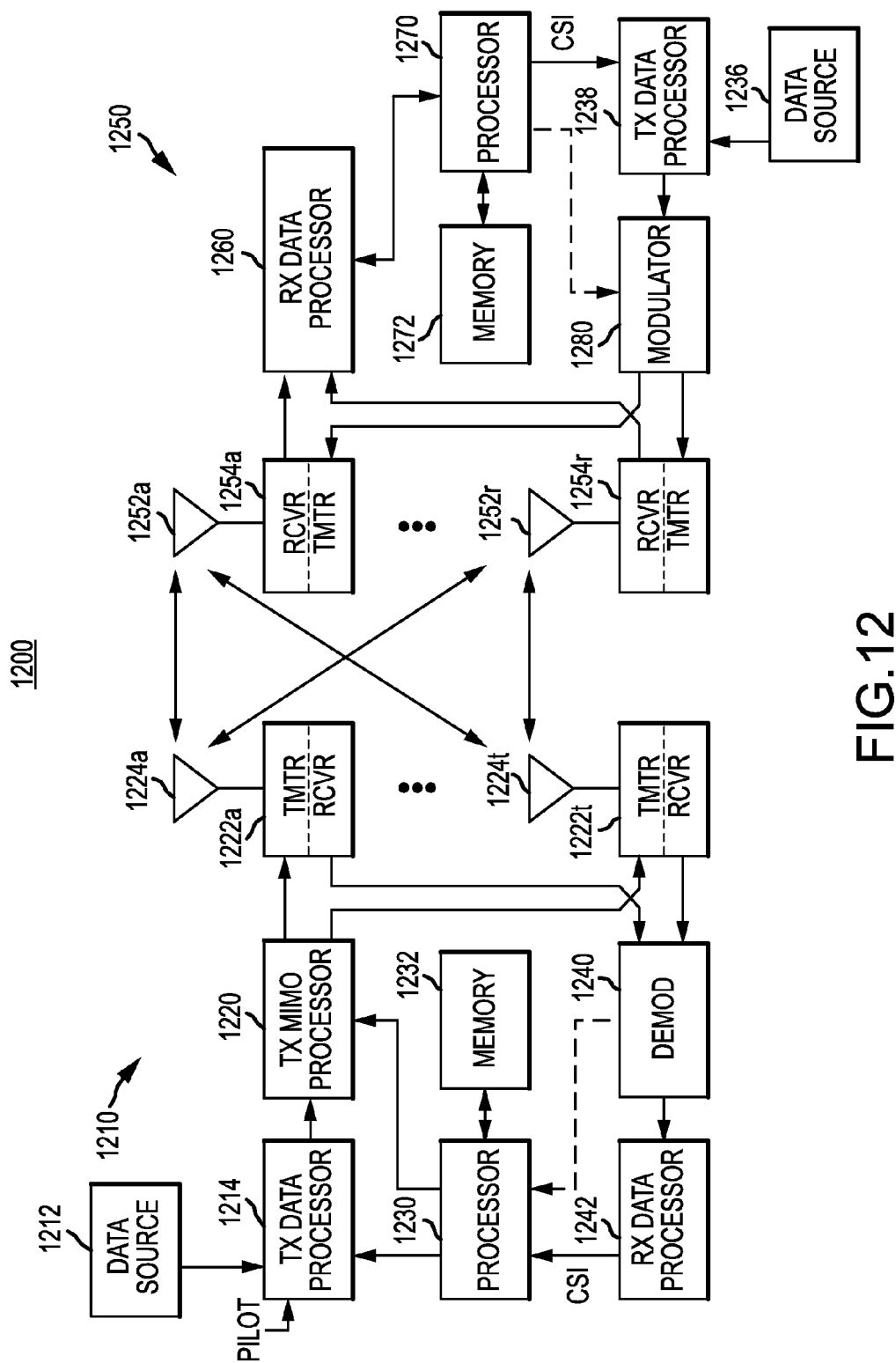
FIG. 12 illustrates an example of a block diagram of a wireless communication system according to one aspect of the present disclosure.

FIG. 12 illustrates an example of a block diagram of a wireless communication system according to one aspect of the present disclosure. Illustrated in FIG. 12 are a transmitter system 1210 (also known as the access point) and a receiver system 1250 (also known as access terminal) in a MIMO system 1200. At the transmitter system 1210, traffic data for a number of data streams is provided from a data source 1212 to a transmit (TX) data processor 1214. In one example, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1230.

The modulation symbols for all data streams are then provided to a TX MIMO processor 1220, which may further process the modulation symbols (e.g., for OFDM). TX MIMO processor 1220 then provides NT modulation symbol streams to NT transmitters (TMTR) 1222a through 1222t. In certain embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 1222a through 1222t are then transmitted from NT antennas 1224a through 1224t, respectively.

At receiver system 1250, the transmitted modulated signals are received by NR antennas 1252a through 1252r and the received signal from each antenna 1252 is provided to a respective receiver (RCVR) 1254a through 1254r. Each receiver 1254 conditions (e.g., filters, amplifies, and down-converts) a respective received signal, digitizes the conditioned signal to provide samples, and further processes the samples to provide a corresponding "received" symbol stream.

An RX data processor 1260 then receives and processes the NR received symbol streams from NR receivers 1254 based on a particular receiver processing technique to provide NT "detected" symbol streams. The RX data processor 1260 then demodulates, deinterleaves, and decodes each detected symbol stream to recover the traffic data for the data stream. The processing by RX data processor 1260 is complementary to that performed by TX MIMO processor 1220 and TX data processor 1214 at transmitter system 1210. A processor 1270 periodically determines which pre-coding matrix to use (discussed below). The processor 1270 formulates a reverse link message comprising a matrix index portion and a rank value portion.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by transmitters 1254a through 1254r, and transmitted back to transmitter system 1210.

At transmitter system 1210, the modulated signals from receiver system 1250 are received by antennas 1224, conditioned by receivers 1222, demodulated by a demodulator 1240, and processed by a RX data processor 1242 to extract the reserve link message transmitted by the receiver system 1250. The processor 1230 then determines which pre-coding matrix to use for determining the beamforming weights then processes the extracted message.

Figure 13:
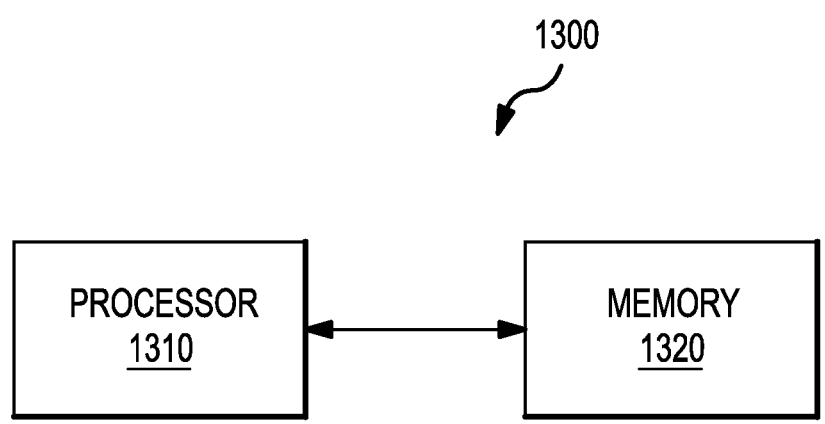
FIG. 13 illustrates an example of a device comprising a processor in communication with a memory for executing the processes for reducing the frequency of forwarding server messages to a mobile station.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 13 illustrates an example of a device 1300 comprising a processor 1310 in communication with a memory 1320 for executing the processes for reducing the frequency of forwarding server messages to a mobile station. In one example, the device 1300 is used to implement the algorithm illustrated in FIG. 5. In one aspect, the memory 1320 is located within the processor 1310. In another aspect, the memory 1320 is external to the processor 1310. In one aspect, the processor includes circuitry for implementing or performing the various flow diagrams, logical blocks and/or modules described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for reducing frequent server messages comprising:
    receiving a server request at a servicing node, the server request received from a network server and intended for a mobile station;
    determining, at the servicing node, whether to forward the server request from the servicing node to the mobile station by checking a timer at the servicing node in response to receiving the server request, including checking if a first timing threshold associated with the servicing node is greater than a second timing threshold associated with the network server for initiating the server request; and
    transmitting, by the servicing node, a server response to the network server based at least in part on the server request on behalf of the mobile station.

2. The method of claim 1, wherein the determining step is based on link layer signaling exchange with the mobile station, and wherein the transmitting step does not include forwarding the server request to the mobile station.

3. The method of claim 1, wherein the receiving the server request includes receiving a keepalive request.

4. The method of claim 3, wherein the receiving the keepalive request uses a packet filter to detect the keepalive request, and wherein the packet filter is sent either by the mobile station or by the network server.

5. The method of claim 3 further comprising converting the keepalive request to a link layer keepalive request.

6. The method of claim 3, wherein the timer is an inactivity timer related to communications from the mobile station, and
    the determining whether to forward the server request includes evaluating a value of the inactivity timer related to communications from the mobile station.

7. The method of claim 6, further comprising resetting the inactivity timer upon the receiving the keepalive response.

8. The method of claim 6, further comprising:
    forwarding the keepalive request to the mobile station based at least in part on the value of the inactivity timer; and
    receiving the server response from the mobile station, wherein the server response is a keepalive response.

9. The method of claim 8 wherein the inactivity timer is a link layer inactivity timer.

10. The method of claim 3, wherein the keepalive message is a layer 2 tunneling protocol (L2TP) keepalive message from the network server.

11. The method of claim 10, wherein the timer is an inactivity timer, the method further comprising:
    converting the L2TP keepalive message to a point-to-point protocol (PPP) link control protocol (LCP) echo request; and
    transmitting the PPP LCP echo request to the mobile station based at least in part on a value of the inactivity timer.

12. The method of claim 11, further comprising:
    receiving an LCP echo reply from the mobile station; and
    transmitting a zero length body acknowledgement to the network server in response to the L2TP keepalive message based at least in part on the receiving the LCP echo reply.

13. The method of claim 11, wherein the inactivity timer is a Tracking-Area-Update timer in a long term evolution (LTE) system.

14. The method of claim 1, wherein the receiving the server request includes receiving a L2TP control protocol (LCP) echo request from the network server, and the transmitting the server response includes transmitting an LCP echo reply to the network server.

15. An apparatus for reducing frequent server messages, the apparatus comprising a processor and a memory, the memory containing program code executable by the processor for performing the following:
    receiving a server request at a servicing node, the server request received from a network server and intended for a mobile station;
    determining, at the servicing node, whether to forward the server request from the servicing node to the mobile station by checking a timer at the servicing node in response to receiving the server request, including checking if a first timing threshold associated with the servicing node is greater than a second timing threshold associated with the network server for initiating the server request; and
    transmitting, by the servicing node, a server response to the network server based at least in part on the server request on behalf of the mobile station.

16. The apparatus of claim 15 wherein the program code for determining is enabled based on link layer signaling exchange with the mobile station, and wherein the program code for transmitting does not include program code for forwarding the server request to the mobile station.

17. The apparatus of claim 15, wherein the program code for receiving the server request includes program code for receiving a keepalive request.

18. The apparatus of claim 17, wherein the memory further comprising program code for using a packet filter to detect the keepalive request, and wherein the packet filter is sent either by the mobile station or by the network server.

19. The apparatus of claim 17 wherein the memory further comprising program code for converting the keepalive request to a link layer keepalive request.

20. The apparatus of claim 17, wherein the timer is an inactivity timer related to communications from the mobile station, and
the memory further comprising program code for evaluating a value of the inactivity timer related to communications from the mobile station.

21. The apparatus of claim 20, wherein the memory further comprising program code for resetting the inactivity timer upon the receiving the keepalive response.

22. The apparatus of claim 20, wherein the memory further comprising program code for:
forwarding the keepalive request to the mobile station based at least in part on the value of the inactivity timer; and
receiving the server response from the mobile station, wherein the server response is a keepalive response.

23. The apparatus of claim 22 wherein the inactivity timer is a link layer inactivity timer.

24. The apparatus of claim 17, wherein the keepalive message is a layer 2 tunneling protocol (L2TP) keepalive message from the network server.

25. The apparatus of claim 24, wherein the timer is an inactivity timer, and the memory further comprising program code for:
converting the L2TP keepalive message to a point-to-point protocol (PPP) link control protocol (LCP) echo request; and
transmitting the PPP LCP echo request to the mobile station based at least in part on a value of the inactivity timer.

26. The apparatus of claim 25, wherein the memory further comprising program code for:
receiving an LCP echo reply from the mobile station; and
transmitting a zero length body acknowledgement to the network server in response to the L2TP keepalive message based at least in part on the receiving the LCP echo reply.

27. The apparatus of claim 25, wherein the inactivity timer is a Tracking-Area-Update timer in a long term evolution (LTE) system.

28. The apparatus of claim 15, wherein the memory further comprising program code for receiving a L2TP control protocol (LCP) echo request from the network server and for transmitting an LCP echo reply to the network server.

29. An apparatus for reducing frequent server messages comprising:
means for receiving a server request at a servicing node, the server request received from a network server and intended for a mobile station;
means for determining, at the servicing node, whether to forward the server request from the servicing node to the mobile station by checking a timer at the servicing node in response to receiving the server request, including checking if a first timing threshold associated with the servicing node is greater than a second timing threshold associated with the network server for initiating the server request; and
means for transmitting, by the servicing node, a server response to the network server based at least in part on the server request on behalf of the mobile station.

30. The apparatus of claim 29, wherein the means for determining is enabled based on link layer signaling exchange with the mobile station, and wherein the means for transmitting step does not include means for forwarding the server request to the mobile station.

31. The apparatus of claim 29 further comprising means for receiving a keepalive request.

32. The apparatus of claim 31, wherein the means for receiving the keepalive request uses a packet filter to detect the keepalive request, and wherein the packet filter is sent either by the mobile station or by the network server.

33. The apparatus of claim 31 further comprising means for converting the keepalive request to a link layer keepalive request.

34. The apparatus of claim 31, wherein the timer is an inactivity timer related to communications from the mobile station, and the apparatus further comprising means for evaluating a value of the inactivity timer related to communications from the mobile station.

35. The apparatus of claim 34, further comprising means for resetting the inactivity timer upon the receiving the keepalive response.

36. The apparatus of claim 34, further comprising:
means for forwarding the keepalive request to the mobile station based at least in part on the value of the inactivity timer; and
means for receiving the server response from the mobile station, wherein the server response is a keepalive response.

37. The apparatus of claim 36 wherein the inactivity timer is a link layer inactivity timer.

38. The apparatus of claim 31, wherein the keepalive message is a layer 2 tunneling protocol (L2TP) keepalive message from the network server.

39. The apparatus of claim 38, wherein the timer is an inactivity timer, and the apparatus further comprising:
means for converting the L2TP keepalive message to a point-to-point protocol (PPP) link control protocol (LCP) echo request; and
means for transmitting the PPP LCP echo request to the mobile station based at least in part on a value of the inactivity timer.

40. The apparatus of claim 39, further comprising:
means for receiving an LCP echo reply from the mobile station; and
means for transmitting a zero length body acknowledgement to the network server in response to the L2TP keepalive message based at least in part on the receiving the LCP echo reply.

41. The apparatus of claim 39, wherein the inactivity timer is a Tracking-Area-Update timer in a long term evolution (LTE) system.

42. The apparatus of claim 29, wherein the means for receiving the server request includes means for receiving a L2TP control protocol (LCP) echo request from the network server, and the means for transmitting the server response includes means for transmitting an LCP echo reply to the network server.

43. A computer program product, comprising a non-transitory computer-readable medium including program codes stored thereon, executable by a processor for performing a method comprising:
- receiving a server request at a servicing node, the server request received from a network server and intended for a mobile station;
- determining, at the servicing node, whether to forward the server request from the servicing node to the mobile station by checking a timer at the servicing node in response to receiving the server request, including checking if a first timing threshold associated with the servicing node is greater than a second timing threshold associated with the network server for initiating the server request; and
- transmitting, by the servicing node, a server response to the network server based at least in part on the server request on behalf of the mobile station.

* * * * *